United States Patent

[11] 3,581,076

[72] Inventors Mauritz L. Granberg
Minneapolis;
Hubert W. Mueller, Jr., Hamburg, both of, Minn.

[21] Appl. No. 871,162
[22] Filed July 17, 1969
Division of Ser. No. 569,481
Aug. 1, 1966, Pat. No. 3,510,634
[45] Patented May 25, 1971

[73] Assignee Sperry Rand Corporation
New York, N.Y.

[54] DIGITAL TO ANALOG CURRENT DISTRIBUTION CIRCUIT

1 Claim, 3 Drawing Figs.

[52] U.S. Cl. .......... 235/154, 340/347
[51] Int. Cl. .......... H03k 13/04
[50] Field of Search .......... 235/154, 150; 340/347

[56] References Cited
UNITED STATES PATENTS

| | | | |
|---|---|---|---|
| 3,134,098 | 5/1964 | Herzl | 340/347 |
| 3,305,855 | 2/1967 | Kaneko | 340/347 |

*Primary Examiner*—Maynard R. Wilbur
*Assistant Examiner*—Michael K. Wolensky
*Attorneys*—Thomas J. Nikolai, Charles A. Johnson and John P. Dority

ABSTRACT: A current distribution circuit suitable for use in a digital-to-analog converter in which digital signals are applied either directly or through a logic network to selected flip-flop stages such that the flip-flops produce a number of output signals which individually represent a given increment of current. These current increments are made available to a resistive ladder type current metering circuit to produce the desired analog voltage.

D/A CONVERTER

INVENTORS
MAURITZ L. GRANBERG
HUBERT W. MUELLER, JR.
BY Thomas J. Nikolai
ATTORNEY

CURRENT DISTRIBUTION CIRCUIT $$32 = 2^9 + 2^8 + 2^7 + 2^6 + 2^5$$
$$64 = 2^9 + 2^8 + 2^7 + 2^6$$
$$96 = 2^9 + 2^8 + 2^7 + 2^6 \bullet 2^5$$
$$128 = 2^9 + 2^8 + 2^7$$
$$160 = 2^9 + 2^8 + 2^7 (2^6 + 2^5)$$
$$192 = 2^9 + 2^8 + 2^7 \bullet 2^6$$
$$224 = 2^9 + 2^8 + 2^7 (2^6 \bullet 2^5)$$
$$256 = 2^9 + 2^8$$
$$288 = 2^9 + 2^8 (2^7 + 2^6 + 2^5)$$
$$320 = 2^9 + 2^8 (2^7 + 2^6)$$
$$352 = 2^9 + 2^8 (2^7 + 2^6 \bullet 2^5)$$
$$384 = 2^9 + 2^8 \bullet 2^7$$
$$416 = 2^9 + 2^8 \bullet 2^7 (2^6 + 2^5)$$
$$448 = 2^9 + 2^8 \bullet 2^7 \bullet 2^6$$
$$480 = 2^9 + 2^8 \bullet 2^7 \bullet 2^6 \bullet 2^5$$
$$512 = 2^9$$

$$544 = 2^9 (2^8 + 2^7 + 2^6 + 2^5)$$
$$576 = 2^9 (2^8 + 2^7 + 2^6)$$
$$608 = 2^9 (2^8 + 2^7 + 2^6 \bullet 2^5)$$
$$640 = 2^9 (2^8 + 2^7)$$
$$672 = 2^9 [2^8 + 2^7 \bullet (2^6 + 2^5)]$$
$$704 = 2^9 (2^8 + 2^7 \bullet 2^6)$$
$$736 = 2^9 (2^8 + 2^7 \bullet 2^6 \bullet 2^5)$$
$$768 = 2^9 \bullet 2^8$$
$$800 = 2^9 \bullet 2^8 (2^7 + 2^6 + 2^5)$$
$$832 = 2^9 \bullet 2^8 (2^7 + 2^6)$$
$$864 = 2^9 \bullet 2^8 (2^7 + 2^6 \bullet 2^5)$$
$$896 = 2^9 \bullet 2^8 \bullet 2^7$$
$$928 = 2^9 \bullet 2^8 \bullet 2^7 (2^6 + 2^5)$$
$$960 = 2^9 \bullet 2^8 \bullet 2^7 \bullet 2^6$$
$$992 = 2^9 \bullet 2^8 \bullet 2^7 \bullet 2^6 \bullet 2^5$$

Fig. 3

DIGITAL TO ANALOG CURRENT DISTRIBUTION CIRCUIT

This application is a division of application Ser. No. 569,481, filed Aug. 1, 1966.

BRIEF SUMMARY OF THE INVENTION

The above reference U.S. Pat. application, Ser. No. 569,481 (now U.S. Pat. No. 3,510,634) contains a full and complete disclosure of the digital vector generator apparatus in which the current distribution circuit claimed herein is employed. The current distribution circuit obviates the need for expensive power transistors in the implementation of the digital-to-analog converter portion of the vector generator. By utilizing the current distribution, large increments of current need not be switched by the transistors in the digital-to-analog converter, but instead, the deflection current is broken down into several smaller increments which can be handled by conventional transistors.

The current distribution circuit can best be understood by referring to the following in which:

FIG. 3 is a table showing the equations for the connections to various stages of the current distribution circuit.

Figure 1:
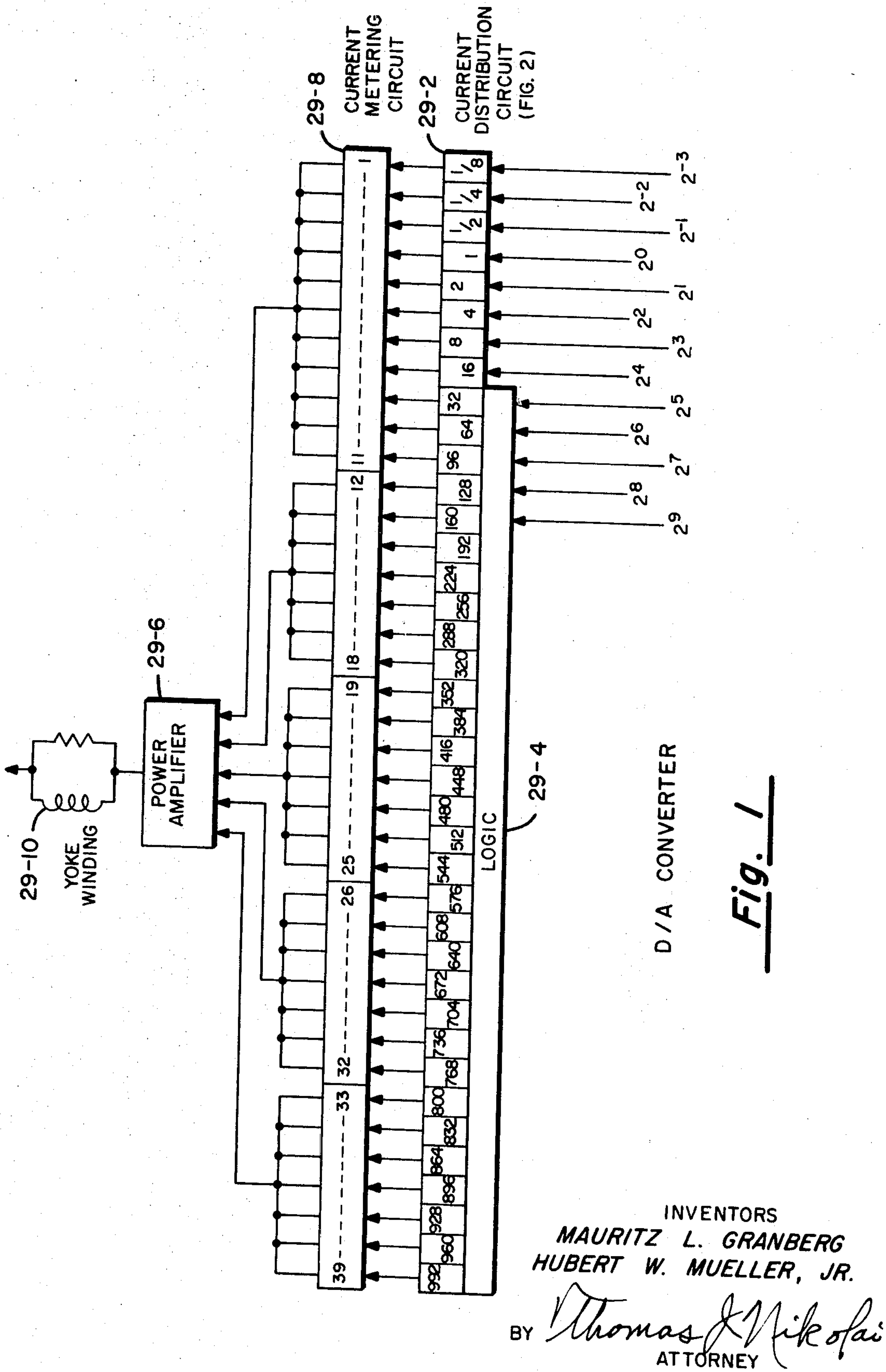
FIG. 1 illustrates generally the digital-to-analog converter utilized in the vector generator apparatus.

The digital-to-analog converter utilized in the vector generator is shown in FIG. 1 and consists of the 13 input lines from either the SET or CLEAR side of either the X or the Y register, a current distribution circuit 29–2, a current metering circuit 29–8, and a power amplifier 29–6. The output of the power amplifier is coupled to the yoke winding 29–10 of the cathode ray tube. If the deflection windings are operated in push-pull as they are in the preferred embodiment of the present invention, four such circuits shown in FIG. 1 are utilized. Two circuits are utilized in push-pull for the X-deflection circuits and two for the Y-deflection circuits.

It is obvious that the 13 bits from the X or Y registers could be coupled directly to a digital-to-analog converter current metering circuit but it is inadvisable since the presence of bits $2^5$ through $2^9$ cause large increments of currents to be switched by the transistors in the digital-to-analog converter. It has been found that large increments of current prevent the transistors from switching fast enough; therefore current distribution circuit 29–2 is utilized. The first eight flip-flops of the current distribution circuit receive directly the inputs of stages $2^{11}$ through $2^{13}$ and $2^0$ through $2^4$. However, bits $2^5$ through $2^9$ are coupled to logic circuit 29–4 which produces 31 different outputs to be stored in the 31 remaining flip-flops of the current distribution circuit. These 31 different outputs cause current metering circuit 29–8 to produce 31 increments of currents with each increment providing 32 units for a total of 992 units of current. Adding the 31 units from the first eight flip-flops of the current distribution circuit, the current metering circuit is capable of producing 1023 units of current with the addition of fractional increments of one-half, one-fourth, and one-eighth unit. All of the 39 current metering circuits are of a well-known type in which the slope or rise and fall time of the output signal is constant and is of the type disclosed in U.S. Pat. No. 3,192,403, patented June 29, 1965, and issued to Bernfeld et al. The desired embodiment is disclosed in commonly assigned copending application Ser. No. 569,181, filed Aug. 1, 1966 (now U.S. Pat. No. 3,434,135). In order to enable power amplifier 29–6 to better handle the current supplied to it, the outputs of the current metering circuit 29–8 are divided and connected in five parallel groups.

CURRENT DISTRIBUTION CIRCUIT

Figure 2:
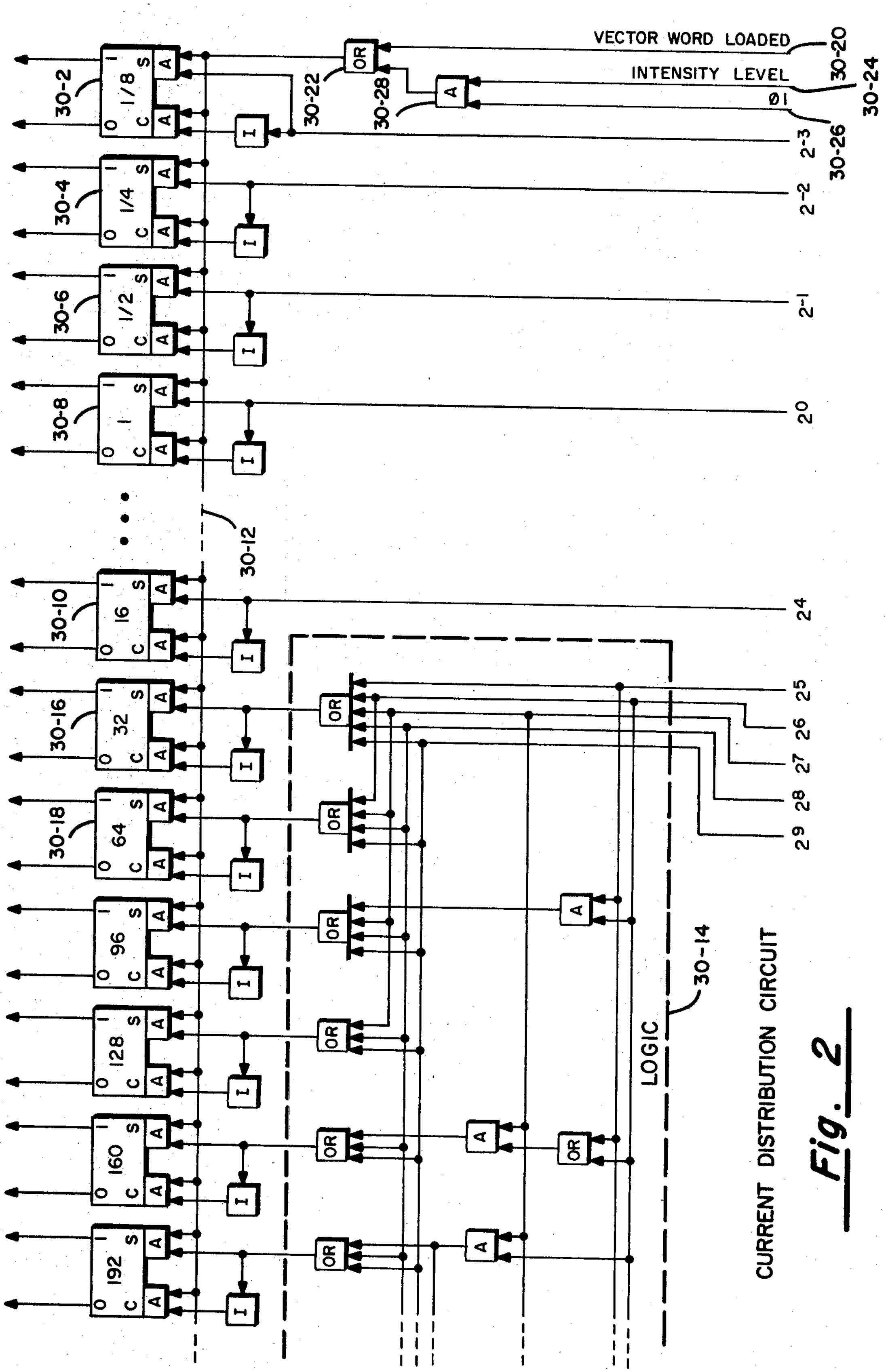
FIG. 2 illustrates the current distribution circuit that forms part of the digital-to-analog converter of FIG. 1.

FIG. 2 is a diagram of a current distribution circuit showing five flip-flops receiving data directly from the X or Y registers and six flip-flops connected to the logic circuit that causes each of the flip-flops to produce a signal representing 32 increments of current whenever the particular flip-flop is set.

Flip-flops 30–2, 30–4 and 30–6 receive data directly from stages $2^{13}$, $2^{12}$ and $2^{11}$ respectively of the X or Y register. Flip-flops 30–8 through 30–10 receive information directly from stages $2^0$ through $2^4$ of the X or Y registers respectively. During the I/O cycle, the data stored in the X and Y registers which represent the origin of the vector should be coupled to the D/A converter in order to move the beam to the proper position to begin drawing the vector. This is accomplished by the Vector Word Loaded signal on line 30–20 from FIG. 9 in the aforementioned U.S. Pat. No. 3,434,135. This signal passes through OR gate 30–22 on line 30–12 to the AND gates on both the SET and CLEAR side of each flip-flop and provides the enable signal which causes the data from the X or Y register to be stored in the corresponding flip-flops of the Current Distribution Circuit. At this time, however, the Intensity Flip-flop shown in FIG. 9 in the aforementioned U.S. Pat. No. 3,434,135 is not SET, and therefore, the beam can move to the position of the vector origin without being seen. However, during each Vector Drawing cycle, as the beam moves away from the vector origin, the data stored in the X and Y registers must be coupled to the D/A converter. Thus, when the Intensity flip-flop is SET on the first $\Phi_1$ of the Vector Drawing cycle after the Draw Flag flip-flop in FIG. 9 in the aforementioned U.S. Pat. No. 3,434,135 is SET, the Intensity Level Select signal on line 30–24 and the $\Phi_1$ clock signal on line 30–26 cause AND gate 30–28 to produce an output which passes through OR gate 30–22 on line 30–12 to the AND gates on both the SET and CLEAR side of each flip-flop and provides the enable signal which causes the data from the X or Y register to be stored in the corresponding flip-flops of the Current Distribution Circuit. Thus, as the X or Y register is incremented each Vector Drawing Cycle, the incremented data is transferred to the D/A converter to cause the beam to move accordingly. If a binary "1" is present on any of the lines from the X or Y register, the enable signal on line 30–12 causes the binary "1" to set the flip-flop to which it is associated and, thus, stored the "1" therein. If a binary 0 is present on any of the lines from the X or Y registers, an inverter which is connected to the CLEAR side of the flip-flop causes the binary "1" to be produced which, when the enable signal is present on line 30–12, causes the respective flip-flops to be CLEANED and thus a 0 is stored therein. Input lines from stages $2^5$ through $2^9$ from the X or Y registers are applied to the logic circuit 30–14. For purposes of simplicity of the drawings, only six stages are shown connected to the logic circuit. However, the other 25 remaining stages have inputs $2^5$ through $2^9$ coupled to them by the logic circuit 30–14 as shown in the Table in FIG. 31. Thus, flip-flop 30–16 will produce an output whenever any of stages $2^5$ through $2^9$ of the X or Y registers produce an output signal. In a similar manner, flip-flop 30–18 will produce an output whenever it has an input signal from any of the stages $2^6$ through $2^9$ of the X or Y register. The combination of inputs such as required for the other flip-flops to produce an output signal can readily be determined by the Table shown in FIG. 3 and so it can be seen that if a signal is present from stage $2^6$ of the X or Y register, both flip-flops 30–16 and 30–18 will produce an output and since each stage will produce a signal representing 32 increments of currents, the signal from stage $2^6$ of the X or Y register will cause output signals representing 64 increments of current. In a like manner, each of the other stages producing an output signal will cause various combinations of the flip-flop to produce output signals representing the desired increments of current.

Thus, the current distribution circuit comprises a first group of $n+p$ bistable circuits coupled to said first storage means (the X or Y register) for receiving major position bits from $n$ of $j$ (5 of 10 in the preferred embodiment) bistable circuits and minor position bits from $p$ (3 in the preferred embodiment) bistable circuits and producing output signals representing $$2^n+\sum_{p=1}^{p=1} 2^{-p}$$

unit increments of current (32+0.875 in the preferred embodiment) where $n>0$, $p>0$ and $i$ is an integer$>1$, a logic circuit coupled to said first storage means for receiving the remaining $j-n$ major position bits (5 in the preferred embodiment) where $r=2^{j-n}-1$, and a second group of $r$ bistable circuits coupled to said logic circuit for receiving said $r$ control signals and producing $r$ output signals each representing an increment of current $I$ where $$I=\frac{2^j-2^n}{r}$$

It is understood that suitable modifications may be made in the structure as disclosed provided such modifications come within the spirit and scope of the appended claims. Having now, therefore, fully illustrated and described out invention, what we claim to be new and desire to protect by Letters Patent is.

1. A current distribution circuit for receiving first and second bits of digital information representing first increments of current from a storage means and producing output signals representing second increments of current, said circuit comprising:

a. a first group of $n+p$ bistable circuits coupled to said storage means for receiving $n$ of $j$ first bits and $p$ second bits and producing output signals representing $$2^n+\sum_{p=1}^{p=i}2^{-p}$$

unit increments of current where $n>0$, $p>0$ and $i$ is an integer $>1$, b. a logic circuit coupled to said storage means for receiving the remaining $j-n$ first bits and producing $r$ control signals where $r=2^{j-n}-1$, and c. a second group of $r$ bistable circuits coupled to said logic circuit for receiving said $r$ control signals and producing $r$ output signals each representing an increment of current $I$ where $$I=\frac{2^j-2^n}{r}$$

UNITED STATES PATENT OFFICE
CERTIFICATE OF CORRECTION

Patent No. 3,581,076 Dated May 25, 1971

Inventor(s) Mauritz L. Granberg et al.

It is certified that error appears in the above-identified patent and that said Letters Patent are hereby corrected as shown below:

Column 4, line 13, "$r = 2^{jln} -1$," should read -- $r = 2^{j-n}-1$, --.

Signed and sealed this 23rd day of November 1971.

(SEAL)
Attest:

EDWARD M.FLETCHER,JR.
Attesting Officer

ROBERT GOTTSCHALK
Acting Commissioner of Patents